Sept. 4, 1934.  G. H. DOWTY  1,972,216
CONSTRUCTION OF AIRCRAFT DISK TYPE LANDING WHEELS
Filed June 16, 1930

INVENTOR.
GEORGE H. DOWTY
BY
ATTORNEY.

Patented Sept. 4, 1934

1,972,216

UNITED STATES PATENT OFFICE 1,972,216

CONSTRUCTION OF AIRCRAFT DISK TYPE LANDING WHEELS

George Herbert Dowty, Cheltenham, England, assignor to Bendix Aviation Corporation, South Bend, Ind., a corporation of Delaware Application June 16, 1930, Serial No. 461,350
In Great Britain August 29, 1929

8 Claims. (Cl. 301—37)

This invention relates to means for improving the aerodynamic shape of aircraft disk type landing wheels in which the disk sides are attached to, or at a point adjacent to, the wheel rim.

In wheels of this type the tire is of greater width than the rim and, if a line is drawn between the outer extremities of the hub and the tire sides, an annular hollow is revealed which is bounded by the said line, tire and disk side.

The presence of this hollow is a source of considerable disturbance to the air stream and has the effect of increasing wheel resistance.

According to this invention I propose to introduce a flexible fairing between the tire and side disk to cover the hollow portion and so provide the wheel with a smooth contour from tire to hub.

It is possible to attach such fairings to the tire by any one of several securing means but in view of the labor involved and the added difficulties in tire removal it is beneficial to provide a more quickly detachable fairing.

In order that the invention may be fully understood and readily carried into effect, it will now be described more fully in conjunction with the accompanying drawing which illustrates its application to an aircraft landing wheel.

Figure 1:
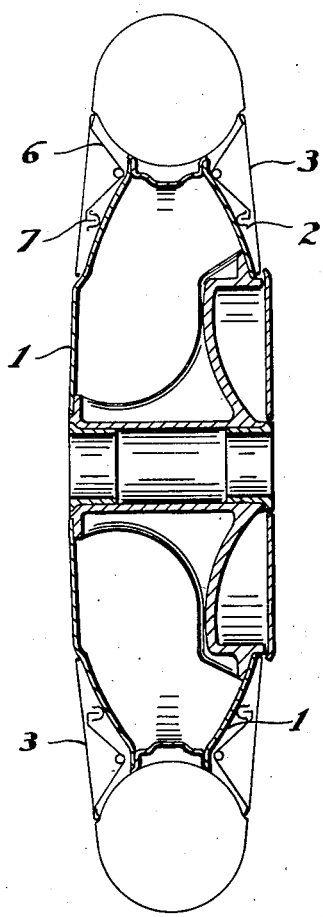
Figure 3:
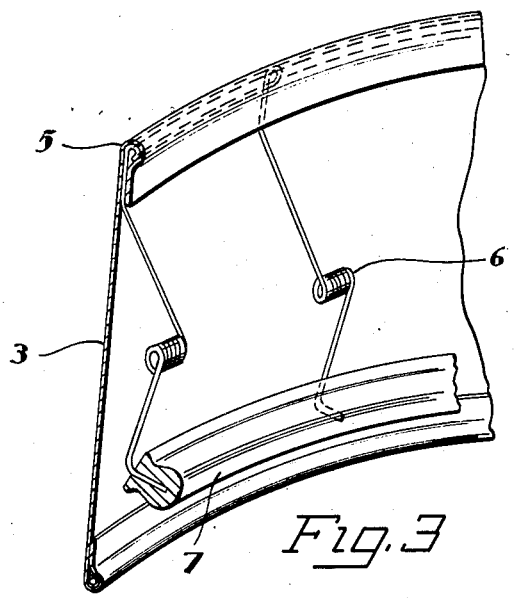
Figure 2:
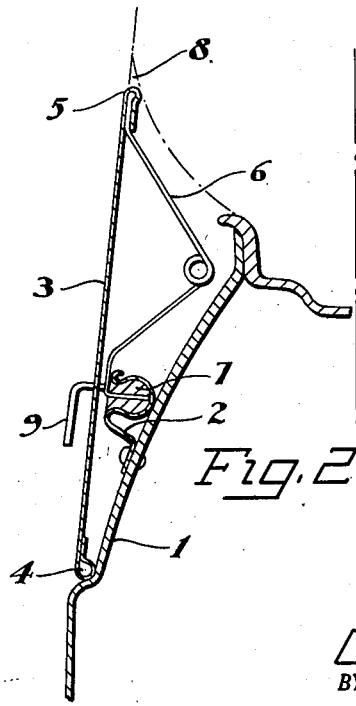

In the drawing Fig. 1 is a cross section through a wheel. Fig. 2 is an enlarged section showing the fairing in greater detail and Fig. 3 shows a portion of fairing with a supporting means.

The wheel disks 1 may be provided with an annular clip 2, or, alternatively, a series of circumferentially disposed clips may be employed. The fairing shields 3 are wired, or otherwise stiffened, at the edge 4, and the outer edge, or rim, 5 is attached to springs 6. These springs are mounted on an annular ring 7 which is carried by the clips 2. The springs are so formed that they place a tension in the shields 3 and also tend to press the outer edge 5 into contact with the tire. This latter condition is necessary since the fairing must be flexible to move under tire flattening and distortion and yet return to its faired position immediately upon release of the load upon the tire.

As described above where the shields 3 are held in contact with the tire under pressure it may be desirable to prevent the shields from lifting by forming a projection 8 on the tire to deflect the air stream away from the point of contact between shield and tire.

To facilitate the erection and removal of fairings on the disk sides it may be advantageous to provide handling clips 9, of wire or like construction, which extend outside shields 3.

The disk sides 1 may be dished at 10 to form a seating for the inside rim of fairing 3 and the wire beading at 4 may be replaced by a small diameter coil spring which is under initial tension and thereby assists in maintaining a close joint.

The methods described and illustrated are particular applications of this invention and it is obvious that the shields can be mounted on the tire and disk sides in a diversity of ways without departing from the spirit of this invention.

Having now particularly described my invention what I claim as new and desire to protect by Letters Patent is:—

1. A shield for a wheel equipped with a tire of greater diameter than the width of the rim of the wheel comprising, a flexible shield extending from one of the walls of the tire to the body of the wheel on one side thereof, a plurality of spring clips secured to the body of the wheel, a member engaging the clips and springs connecting the member to the shield to retain the shield in position.

2. A wheel and tire structure comprising a disk body member, a rim member secured to said body member and a tire supported on said rim, said tire and body member being so constructed and arranged as to provide an annular shouldered depression or cavity in the side face of the wheel and a shield member yieldably secured to said wheel body member, said shield member covering the aforementioned depression to present a substantially uninterrupted outer wheel surface.

3. A wheel comprising a side disk, a rim thereon, and a tire of greater diameter than the width of the rim, said disk having a central substantially flat portion, and an outer conical frustrum portion extending to the rim, said tire having an annular shoulder substantially in the center of the side wall thereof, an annular shield adapted to engage said shoulder at its outer edge, and to extend substantially to the central flat disk portion, and means for securing the shield in place.

4. In combination a wheel having a side disk, a tire, a rim narrower than said tire, an annular shoulder in said disk, located centrally between the center and rim of the wheel, an annular shoulder on the side wall of the tire, an annular shield adapted at its inner and outer edges to lie against said shoulders, and means for resiliently holding said shield in place.

5. A wheel having disk sides, a rim and a tire, an annular recess adjacent the rim and extending to a central point on the tire side wall, and to a central point on the disk side, a slight annular shoulder formed on said tire adjacent the termination of the said recess, an annular shield adapted to smoothly cover said recess and rest against said shoulder, and means for securing said shield in place.

6. A wheel having an annular non-stream line recess, an annular shield adapted to cover said recess, and means attached to the shield and wheel for securing said shield over said recess comprising a substantially continuous annular resilient clip and annular ring therefor adapted to be resiliently held thereby.

7. A wheel having a tire and a rim of narrower width than the tire cross sectional diameter, an annular shoulder centrally located in the side wall of said tire and an annular shield having an outer edge resting in against said shoulder.

8. A wheel having an annular non-stream line recess, an annular shield adapted to cover said recess, and means attached to the shield and wheel between the disk edges to resiliently secure both of said edges in contact with the wheel, said means including annular clip and ring members.

GEORGE H. DOWTY.